United States Patent [19]

Albright

[11] Patent Number: 4,757,182

[45] Date of Patent: Jul. 12, 1988

[54] ELECTRIC WATER HEATER FOR VENDING MACHINES

[75] Inventor: Henry J. Albright, West Des Moines, Iowa

[73] Assignee: Fawn Engineering Corp., Des Moines, Iowa

[21] Appl. No.: 58,342

[22] Filed: Jun. 5, 1987

[51] Int. Cl.[4] .................... H05B 3/82; H05B 1/02; F24H 9/00; F24H 1/20

[52] U.S. Cl. ........................... 219/314; 219/306; 219/316; 219/333

[58] Field of Search ................... 219/310–312, 219/314–316, 318, 296–309, 333

[56] References Cited

U.S. PATENT DOCUMENTS

| | | | |
|---|---|---|---|
| 2,576,603 | 11/1951 | Hines et al. | 219/314 |
| 2,636,974 | 4/1953 | Bowen | 219/335 X |
| 2,643,322 | 6/1953 | Lime et al. | 219/314 |
| 2,689,905 | 9/1954 | Harris | 219/316 X |
| 2,742,560 | 4/1956 | Liebhafsky | 219/315 |
| 4,604,515 | 8/1986 | Davidson | 219/314 X |

FOREIGN PATENT DOCUMENTS

| | | | |
|---|---|---|---|
| 602856 | 9/1934 | Fed. Rep. of Germany | 219/314 |
| 653551 | 11/1928 | France | 219/314 |
| 1341893 | 9/1963 | France | 219/314 |
| 2524123 | 9/1983 | France | 219/314 |
| 183406 | 6/1936 | Switzerland | 219/312 |
| 203649 | 6/1939 | Switzerland | 219/314 |
| 731769 | 6/1955 | United Kingdom | 219/314 |

*Primary Examiner*—Anthony Bartis
*Attorney, Agent, or Firm*—Henderson & Sturm

[57] ABSTRACT

An electric water heater (10) for a vending unit has an elongated cylindrical housing (11) defining a water heating chamber divided lengthwise into a large inlet subchamber (24) and a small outlet subchamber (27) by a panel (26) extending the entire length of the heating chamber and supported by the arms (32, 33) of a lengthwise disposed U-shaped thickened embossment (14) integrally formed with the inner surface of the housing, with the U-shaped embossment (14) and panel (26) defining the outlet subchamber (27). Cold water enters the inlet subchamber (24) under control of a float valve unit (17) and is heated to a predetermined temperature by an electric heater (19) therein. The heated water then flows through a restricted opening (31) in the panel (26) into the outlet subchamber (27) for discharge from a fluid outlet (13). The smaller outlet subchamber (27) restricts convection action therewithin such that the hot water stored therein retains its heat longer than that stored in the inlet subchamber (24).

3 Claims, 1 Drawing Sheet

ELECTRIC WATER HEATER FOR VENDING MACHINES

TECHNICAL FIELD

The present invention relates generally to a hot water heater, and more particularly to a hot water heater for use with a vending machine or the like where constant availability of hot water for successive "vends" or draws of the hot water for coffee, soup or the like is required.

BACKGROUND ART

Conventional hot water heating apparatuses are shown in U.S. Pat. No. 3,247,940 to Christine, et al., and U.S. Pat. No. 3,884,389 to Martin. Each apparatus includes a larger lower chamber having a heating element provided in the bottom thereof for heating the water therein prior to discharge; the Martin patent structure aiding the efficiency by having the cold water duct within the hot water chamber and with controls such that the heater is energized to begin heating in response to the temperature of the inflowing cool water.

Although these conventional heaters are of sufficient efficiency to provide water of sufficient high temperatures for vending purposes, the number of vends or the quantity of hot water immediately available without the temperature thereof reduced, is restricted; for example, to approximately twenty cups of coffee.

SUMMARY OF THE INVENTION

The invention relates to a heater for a vending unit or the like. The heater comprises a cylindrical housing having a chamber, a fluid inlet and a fluid outlet therefor. A float valve unit is mounted within the housing for controlling the level of fluid within the chamber. Heating means is also disposed within housing for heating the fluid and includes a temperature control for the fluid. The chamber is divided into a pair of transversely spaced subchambers by a panel extending the entire length of the chamber and interposed between the fluid inlet and outlet; the panel having an opening formed therein for fluid passage.

It is to the improvement of the quantity of hot water promptly available; for example, forty cups of coffee, without increasing chamber sizes and other constants that this invention is directed.

It is an object of this invention to provide an improved hot water heater for vending machines and the like.

It is another object of this invention to provide a hot water heater having a pair of transversely spaced chambers formed within a container with one of said chambers adapted to retain water therein, prior to discharge, at a higher degree of temperature than that of the other chamber.

Yet another object of the invention is to provide a hot water heater having a pair of transversely spaced chambers formed within a container, with one chamber of a size as to restrict normal convectional flow therewithin such that hot water stored therein retains its heat longer than that of the water stored within the other chamber.

BRIEF DESCRIPTION OF THE DRAWINGS

These and other objectives of the invention will become readily apparent upon a thorough study and review of the following detailed description of the preferred embodiment for carrying out the invention, particularly when viewed in conjunction with the accompanying drawings, wherein.

BEST MODE FOR CARRYING OUT THE INVENTION

Figures 1, 2, 3, 4:
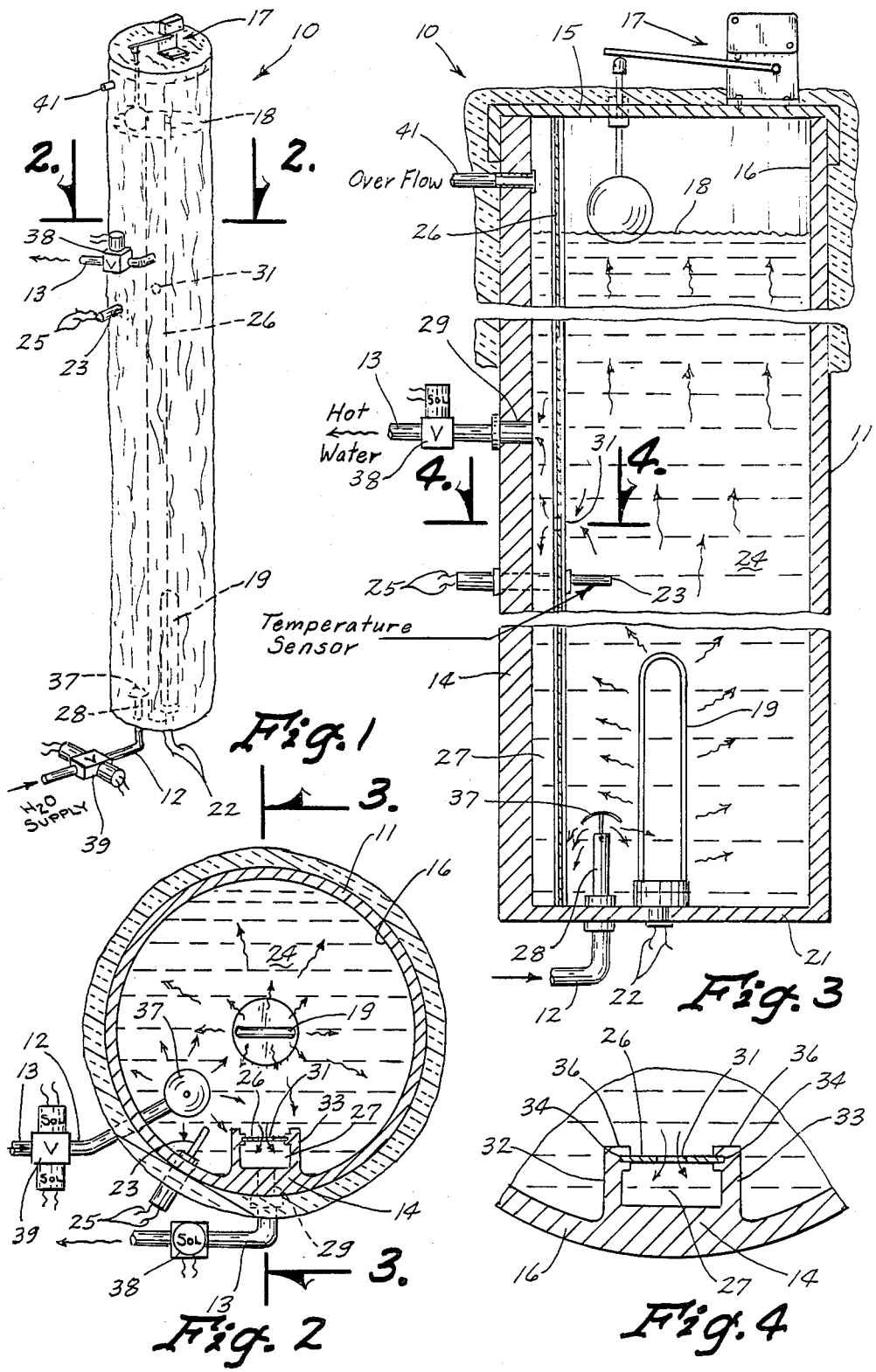
FIG. 1 is a perspective view of the hot water heater of this invention, shown covered with insulation.
FIG. 2 is an enlarged sectional view as taken along the line 2—2 in, FIG. 1.
FIG. 3 is a further enlarged sectional view as taken along the line 3—3 in FIG. 2.
FIG. 4 is an even further enlarged view taken along the line 4—4 in FIG. 3.

Referring now to the drawings herein, the hot water heater of this invention is referred to generally as (10) and comprises basically a cylindrical housing (11) having a fluid, such as water, inlet conduit (12) at the bottom thereof, a fluid outlet conduit (13) formed in an embossment (14) of the housing circular wall (16), and a conventional float valve unit (17) mounted on cap (15) secured to the top of the housing (11) for maintaining a predetermined level of fluid (18) within the housing (11).

The heater (10) comprises further a conventional heating element (19) mounted at the base (21) of the housing (11) and connected by wires (22) to a suitable source of electrical energy and control for heating and maintaining the fluid within the housing (11) at a predetermined temperature; the heating element (19) connected electrically to a temperature sensing element (23) mounted on the wall (16) and extended into the main chamber (24) of the housing (11). Wires (25) connect the element (13) into a conventional electric control circuit (not shown) for the element (23) and heating element (19).

The heater (10) comprises further a panel (26) dividing the housing (11) interior into a pair of sub-chambers, the large, main chamber (24) and a much smaller sub-chamber (27), such that the chambers (24), (27) are both vertically disposed the entire length, or height of the housing (11), are transversely separated as by the panel (26). It will be noted that the inlet conduit (12) opens by a stub shaft (28) (FIG. 3) into the main chamber (24), whereas the fluid outlet conduit (13) leads from a passage (29) (FIGS. 2,3) formed in the embossment (14), which passage (29) leads to the subchamber (27). Thus, the panel (26) is interposed in effect between the inlet and outlet conduits (12), (13), respectively. To permit a restricted flow of fluid to pass through the panel (26) from the inlet chamber (24) to the outlet chamber (27), a small opening (31) (FIGS. 3, 4) is formed in the panel (26) and is located at approximate midpoint the length of the panel (26).

More particularly, the housing (11) has the circular wall (16) of a constant thickness in section except for the embossment (14) which is integral with the remainder of the wall (16), and which embossment (14) has a thickness greater than that of the remainder of the wall (16). A pair of laterally spaced elements (32), (33) are integral with the embossment (14) and extend into the chamber (24) (FIGS. 2,3) to form a U-shape, and slots (34) (FIG. 4) are formed in opposed inner wall portions (36) of the elements (32), (33) such that the elongated panel (26) is vertically movably mounted on the embossment (14).

To diffuse the cool water entering the main chamber under gravity pressure, a baffle (37) is mounted over the outlet end of the inlet conduit shaft (28); and solenoid controlled valves (38), (39) may be connected in the inlet and outlet conduits (12), (13) for conventional control purposes. An overflow conduit (41) (FIGS. 1, 2) leading from the upper end of the housing (11) is provided for safety purposes.

In operation, cool water enters the main chamber (24) via the inlet conduit (12) and is discharged into the lower portion of the chamber (24) through the shaft (28) and diffused by the baffle (37). Heat is being applied by the element (19) and normal convection of the water within the main chamber (24) occurs. The heated water passes from the main chamber (24) to the smaller subchamber (27) via the opening (31) and is restricted as to its convection action due to the decreased size of the subchamber (27). The water in the subchamber (27) also retains its temperature at a higher degree and longer time due to the thickness of the embossment (14), the embossment also retaining its temperature higher and longer than the remaining less thick wall (16) of the housing (11).

Additionally, the reduced size of the subchamber (27) not only maintains the water in the subchamber in a more calm manner, but the small opening (31) prevents the normal water movement in the larger chamber (24) from disadvantageously affecting the water in the subchamber (27), all adding to the heating efficiency of the heater (10).

I claim:

1. A heater for a vending unit or the like comprising:
   an elongated cylindrical housing defining a fluid heating chamber, a fluid inlet for supply of cold water to said chamber, and a fluid outlet for discharge of heated water from said chamber separate from said fluid inlet;
   a water level control means associated with said chamber for controlling the level of fluid within said chamber;
   heating means disposed within said chamber for heating the fluid therein to a predetermined temperature and including a temperature control mounted within said chamber for contacting the fluid therein; and
   means dividing said chamber lengthwise into a pair of transversely positioned side-by-side inlet and outelt subchambers and including a panel extending the entire length of said chamber, said panel being interposed between said inlet and said outlet and having a restricted opening formed therein for limiting the passage of fluid therethrough, and further wherein said means dividing said chamber includes a lengthwise dispsoed U-shaped embossment having arms and integrally formed with the inner surface of the cylindrical housing, and together with said panel defining said outlet subchamber.

2. The heater of claim 1 and further wherein said panel is movably mounted on the arms of said embossment.

3. The heater of claim 1 and further wherein said cylindrical housing has a wall circular in cross section, said wall having a constant thickness except for said embossment, said embossment having a thickness greater than the thickness of the reaminer of said wall, whereby said embossment retains heat longer than the remainder of said wall.

* * * * *